(12) United States Patent
Miyamae et al.

(10) Patent No.: US 9,690,659 B2
(45) Date of Patent: Jun. 27, 2017

(54) PARITY-LAYOUT GENERATING METHOD, PARITY-LAYOUT GENERATING APPARATUS, AND STORAGE SYSTEM

(71) Applicant: FUJITSU LIMITED, Kawasaki-shi, Kanagawa (JP)

(72) Inventors: Takeshi Miyamae, Kawasaki (JP); Takanori Nakao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 52 days.

(21) Appl. No.: 14/814,564

(22) Filed: Jul. 31, 2015

(65) Prior Publication Data

US 2016/0139991 A1    May 19, 2016

(30) Foreign Application Priority Data

Nov. 14, 2014  (JP) .................................. 2014-232052

(51) Int. Cl.
  *G06F 11/10* (2006.01)
(52) U.S. Cl.
  CPC ........ *G06F 11/108* (2013.01); *G06F 11/1076* (2013.01); *G06F 11/1088* (2013.01); *G06F 11/1096* (2013.01)
(58) Field of Classification Search
  CPC . G06F 11/108; G06F 11/1076; G06F 11/1088
  See application file for complete search history.

(56) References Cited

U.S. PATENT DOCUMENTS

| 5,754,756 | A | 5/1998 | Watanabe et al. |
| 5,809,516 | A | 9/1998 | Ukai et al. |
| 8,156,405 | B1* | 4/2012 | Lumb ................. G06F 11/1092 714/770 |
| 8,479,080 | B1* | 7/2013 | Shalvi .................... G06F 11/10 365/185.09 |
| 2006/0053287 | A1* | 3/2006 | Kitamura ............ G06F 11/1076 713/167 |
| 2007/0115731 | A1* | 5/2007 | Hung .................. G06F 11/1088 365/189.05 |

(Continued)

FOREIGN PATENT DOCUMENTS

| JP | 8-185275 | 7/1996 |
| JP | 8-249132 | 9/1996 |

OTHER PUBLICATIONS

Takeshi Miyamae et al., "Erasure Code with Shingled Local Parity Groups for Efficient Recovery from Multiple Disk Failures", 10th Workshop on Hot Topics in System Dependability, HotDep '14, Oct. 5, 2014, <https://www.usenix.org/conference/hotdep14/workshop-program/presentation/miyamae> (6 pages).

*Primary Examiner* — Joseph D Torres
(74) *Attorney, Agent, or Firm* — Fujitsu Patent Center

(57) ABSTRACT

A parity-layout generating method, includes: creating a first local parity layout with a first calculation range for calculating local parity; creating a second local parity layout with a second calculation range for calculating local parity, a length of the second calculation range being different from a length of the first calculation range; and creating, by a computer, a third local parity layout with the first calculation range and the second calculation range by combining the first local parity layout and the second local parity layout.

18 Claims, 8 Drawing Sheets

(56) References Cited

U.S. PATENT DOCUMENTS

2014/0136889 A1\* 5/2014 Kuang ................ G06F 11/1076
  714/15
2014/0208022 A1\* 7/2014 Gordon ............... G06F 11/1076
  711/114

\* cited by examiner

PARITY-LAYOUT GENERATING METHOD, PARITY-LAYOUT GENERATING APPARATUS, AND STORAGE SYSTEM

CROSS-REFERENCE TO RELATED APPLICATION

This application is based upon and claims the benefit of priority of the prior Japanese Patent Application No. 2014-232052, filed on Nov. 14, 2014, the entire contents of which are incorporated herein by reference.

FIELD

The embodiment discussed herein is related to a parity-layout generating method, a parity-layout generating apparatus, and a storage system.

BACKGROUND

In storage systems, the reliability and availability of data are ensured by replication. In the storage systems, technique for a redundant array of inexpensive disks (RAID) that ensures a certain level of reliability by adding a parity disk is used. In the storage systems, local parity calculated using partial data, not all data, is used to ensure a certain level of reliability.

Related technique is disclosed in Japanese Laid-open Patent Publication No. 8-249132 or Japanese Laid-open Patent Publication No. 8-185275.

SUMMARY

According to an aspect of the embodiments, a parity-layout generating method, includes: creating a first local parity layout with a first calculation range for calculating local parity; creating a second local parity layout with a second calculation range for calculating local parity, a length of the second calculation range being different from a length of the first calculation range; and creating, by a computer, a third local parity layout with the first calculation range and the second calculation range by combining the first local parity layout and the second local parity layout.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

For example, when the smallest capacity of a plurality of storage devices are capacity A, the areas of the respective capacities A of the storage devices are used to form one or more parity groups. For example, storage areas in the storage devices are allocated to data in a plurality of blocks. During the storage area allocation, the number of data blocks to be arranged in a physical contiguous area in a disk storage device is determined using the size of data to be cached as a unit of allocation.

For example, it may be difficult to create a parity layout in which the amount of data transferred during recovery is small. For example, when the range for calculating local parity is variable, the number of parity layouts capable being created increases, and there may be cases in which a parity layout in which the amount of data transferred during recovery is small is not created within an allowable time.

Figure 1:
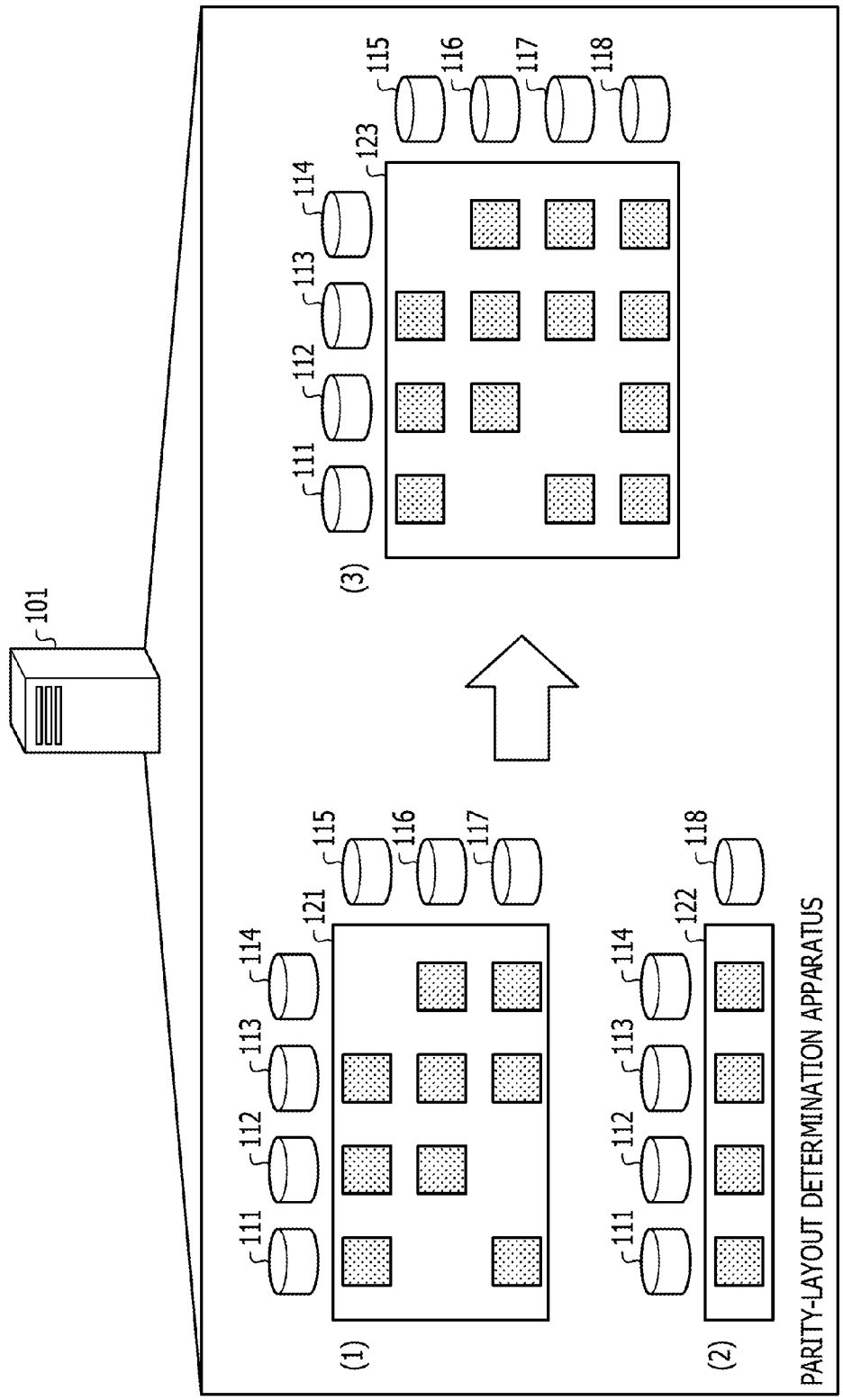
FIG. 1 illustrates an example of a parity-layout determination method.

FIG. 1 illustrates an example of a parity-layout determination method. A parity-layout determination apparatus 101 illustrated in FIG. 1 may be a computer that determines a parity layout.

The term "parity layout" indicates a layout for making a plurality of pieces of data redundant and storing the resulting data. The parity layout is, for example, an arrangement pattern of data and parity into storage areas, involving how the data and parity are to be stored in the storage areas and from what data range the parity is to be calculated. In the case of a parity layout involving calculating parity by using partial data, not all data, it may be referred to as a "local parity layout".

A parity layout is created by, for example, a user specifying the number k of data chunks, the total number m of parity chunks, and the total value c of reliability indices. Each of k, m, and c is a positive integer greater than or equal to 1. The "data chunks" indicates storage areas in which data is stored, and the "number of data chunks" indicates the number of storage areas in which data is stored. For example, when the storage areas are implemented by disks, for example, by a hard disk drive (HDD), the number of data chunks may be the number of disks. The "parity chunks" indicates storage areas in which parity is stored, and the total number of parity chunks may be the number of storage areas in which parity is stored.

The total value c of reliability indices is a number indicating the degree of data redundancy. For example, when the number of failures that occur in k+m storage areas is the total value c of reliability or less, information in the failed storage areas may be recovered. For example, in RAID 5 in which the number of data chunks is 4 and the total number of parity chunks is 1, the total value of reliability indices is 1.

A local parity layout created based on the number k of data chunks, the total number m of parity chunks, and the total value c of reliability indices may be referred to as Shingled Erasure Code (SHEC (k, m, c)). As a method for creating SHEC (k, m, c), for example, the method may be used which is described in Erasure Code with Shingled Local Parity Groups for Efficient Recovery from Multiple Disk Failures, https://www.usenix.org/conference/hot-dep14/workshop-program/presentation/miyamae.

For example, a local parity layout SHEC (k, m, c) is created by shifting the local-parity calculation ranges so that they overlap each other partially. Thus, the local parity layout, even though it is for local parity, may be used for recovery for failures in up to a certain number of storage areas. In the local parity layout, when a failure occurs, part of data is read, and recovery is performed. Accordingly, data may be recovered efficiently, compared with a case of a parity layout in which parity is created using all data. A parity layout in which parity is created using all data may hereinafter be referred to as a "global parity layout".

For example, when the lengths of the local-parity calculation ranges are set to substantially the same in a local parity layout, a recovery efficiency during multiple failures may be better than that in a global parity layout, but a capacity efficiency and a reliability may be worse during a single failure. When the capacity efficiency and the reliability of a local parity layout and the capacity efficiency and the reliability of a global parity layout are set to the same values, the recovery efficiency of the local parity layout may be worse than the recovery efficiency of the global parity layout.

The term "capacity efficiency" indicates the rate of a data storage area in the entire storage area. For example, the capacity efficiency may be calculated as k/(k+m) by using the number k of data chunks and the total number m of parity chunks. The reliability indicates a probability that a failure by which stored information is not recoverable occurs. The recovery efficiency indicates, during recovery, a rate of an average amount of data for recovering information in an area in which data is stored or an area in which parity is stored. The better the recovery efficiency is, the smaller the amount of data transferred during recovery is.

Thus, in the local parity layout, the length of each parity calculation range is varied. In this case, the number of configurable layouts increases excessively, and a parity layout in which the amount of data transferred during recovery is small may not be created within an allowable time. The allowable time is a time allowable for constructing a storage system.

In the parity-layout determination method, a local parity layout is created by combining a plurality of local parity layouts in which the lengths of the calculation ranges for calculating local parity among a plurality of pieces of data are different from each other. Thus, in the parity-layout determination method, a local parity layout in which the amount of data transferred during recovery is small is created within an allowable time. In the parity-layout determination method, when the capacity efficiency and the reliability are set to the same values, a local parity layout in which the recovery efficiency is good may be created. It is sufficient as long as any one of the local parity layouts combined is a local parity layout, and the others may be global parity layouts.

The parity-layout determination method may be executed by, for example, a control unit for a storage device. The parity-layout determination method may be executed by, for example, a computer that is independent from the storage device.

The parity-layout determination apparatus 101 creates a local parity layout 121. For example, the parity-layout determination apparatus 101 creates the local parity layout 121 by specifying the number k of data chunks, the total number m of parity chunks, and the total value c of reliability indices.

In the local parity layout 121 in FIG. 1, k=4, m=3, and c=2 are specified for the number k of data chunks, the total number m of parity chunks, and the total value c of reliability indices, respectively. In the local parity layout 121, the storage area includes disks 111 to 117. The disks 111 to 114 are storage areas in which data is stored, and the disks 115 to 117 are storage areas in which parity is stored. In the local parity layout 121 in FIG. 1, a data range for calculating the parity of the disk 115 includes the disks 111 to 113, and a data range for calculating the parity of the disk 116 includes the disks 112 to 114. In the local parity layout 121 in FIG. 1, a data range for calculating the parity of the disk 117 includes the disks 111, 113, and 114. In the local parity layout 121, the number of data chunks is 4, the total number of parity chunks is 3, and the total value of the reliability indices is 2. Thus, the local parity layout 121 may be referred to as "SHEC (4, 3, 2)".

The length of the calculation range for calculating local parity is the size of the storage area for calculating local parity. For example, when the storage areas are disks, the length of the calculation range is the number of disks. In the local parity layout 121 in FIG. 1, since each local parity is calculated using three disks, the length of the calculation range for calculating the local parity is 3.

The parity-layout determination apparatus 101 creates a local parity layout 122 in which the length of the calculation range for calculating the local parity is different from the length of the local parity layout 121. The parity-layout determination apparatus 101 may create the local parity layout 122, for example, in a similar manner for the local parity layout 121.

In the local parity layout 122 in FIG. 1, k=4, m=1, and c=1 are specified for the number k of data chunks, the total number m of parity chunks, and the total value c of reliability indices. In the local parity layout 122, the storage areas include the disks 111 to 114, and 118. The disks 111 to 114 are storage areas for storing data, and the disk 118 is a storage area for storing the parity. The local parity layout 122 illustrated in FIG. 1 indicates that a data range for calculating the parity of the disk 118 includes the disks 111 to 114. The local parity layout 122 illustrated in FIG. 1 differs from the local parity layout 121 in the calculation range for calculating the local parity, and the length of the calculation range for calculating the local parity is 4. Since, in the local parity layout 122, the number of data chunks is 4, the total number of parity chunks is 1, and the total value of the reliability indices is 1, the local parity layout 122 may be referred to as "SHEC (4, 1, 1)".

The parity-layout determination apparatus 101 creates a local parity layout 123 by combining the local parity layout 121 and the local parity layout 122. The length of the local-parity calculation range in the local parity layout 121 and the length of the local-parity calculation range in the local parity layout 122 are not the same. Thus, the parity-layout determination apparatus 101 creates the local parity layout 123 in which the local-parity calculation ranges have different lengths.

A combination of local parity layouts has a characteristic of addition of the total values of reliability indices before the combination. Thus, combining local parity layouts makes it possible to create the local parity layout 123 in which the total value of reliability indices is large.

In FIG. 1, in the local parity layout 123, storage areas include disks 111 to 118. The disks 111 to 114 are storage areas for storing data, and the disks 115 to 118 are storage areas for storing the parity. The data range for calculating parity of each of the disks 115 to 118 is the same as those in the local parity layout 121 and the local parity layout 122.

In the local parity layout 123, the length of the calculation range for calculating the local parity is 3 for each of the disks 115 to 117 and is 4 for the disk 118. In FIG. 1, the local parity layout 123 is created in which the lengths of the calculation ranges for calculating the local parity are 3 and 4, which are different from each other. In the local parity layout 123, the number of data chunks is 4, and the total number of parity chunks is 4. In the local parity layout 123, the total value of the reliability indices is 3, which is the total value of the reliability indices of the local parity layouts 121 and 122.

Since the local parity layout 123 is formed by combining SHEC (4, 3, 2) and SHEC (4, 1, 1), and is a combination of different local-parity calculation ranges, the local parity layout 123 may also be referred to as "multiple-SHEC (4, 3-1, 2-1)".

In the parity-layout determination method, the local parity layout 123 for making a plurality of pieces of data redundant and storing the pieces of data is created by combining the local parity layouts 121 and 122 in which the lengths of the calculation ranges for calculating the local parity are different from each other.

In the parity-layout determination method, the local parity layout 123 in which the lengths of the local-parity calculation ranges are different is created by combining the local parity layouts in which the lengths of the local-parity calculation ranges are fixed. As a result, the number of configurable layouts does not increase excessively, and thus, in the parity-layout determination method, a parity layout in which the amount of data transferred during recovery is small is created in an allowable time. Accordingly, in the parity-layout determination method, when the capacity efficiency and the reliability are set to the same values, a parity layout in which the recovery efficiency is good may be created. Since the parity layout created by the parity-layout determination method has a good recovery efficiency, the amount of data transferred during recovery may be reduced, and the recovery time may be reduced.

Figure 2:
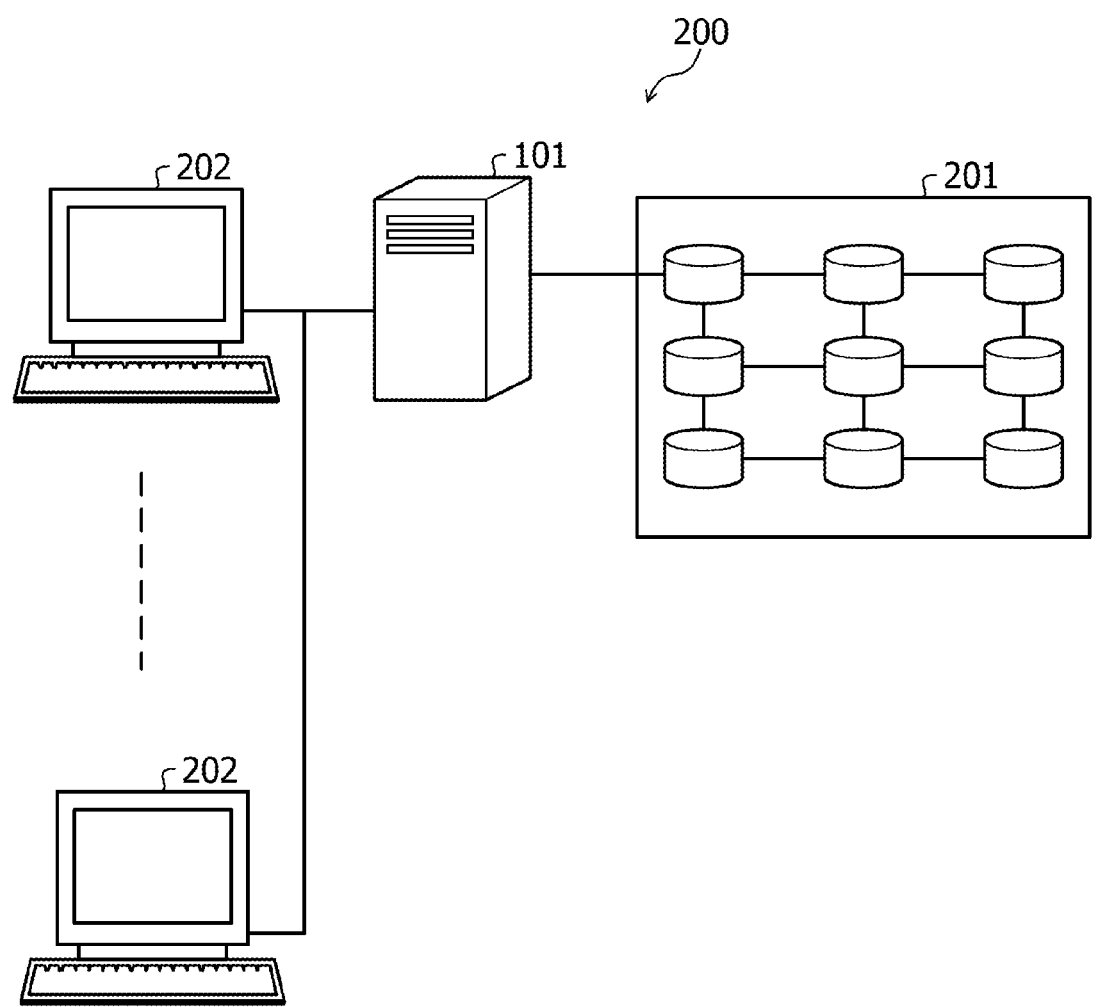
FIG. 2 illustrates an example of a storage system.

FIG. 2 illustrates an example of a storage system. A storage system 200 illustrated in FIG. 2 employs the parity-layout determination method illustrated in FIG. 1.

As illustrated in FIG. 2, the storage system 200 includes the parity-layout determination apparatus 101, a storage device 201 having a plurality of storage areas, and a plurality of host computers 202. The storage system 200 is coupled to the host computers 202 via an interface, such as a Fibre Channel interface, Serial Attached Small Computer System Interface (SAS), or Internet Small Computer System Interface (iSCSI). The parity-layout determination apparatus 101 may also be coupled to the host computers 202 via a network, such as a local area network (LAN), a wide area network (WAN), or the Internet.

The parity-layout determination apparatus 101 may be a computer that executes the parity-layout determination method. The parity-layout determination apparatus 101 may be an apparatus that is substantially the same as a storage control apparatus that performs overall control of the storage system 200.

The storage device 201 has a magnetic-disk drive (HDD) and magnetic disks as storage areas. Under the control of the storage control apparatus, the magnetic-disk drive controls writing/reading of data to/from the magnetic disks. Data written under the control of the magnetic-disk drive is stored on the magnetic disk. The storage system 200 may have a solid-state drive (SSD).

Each host computer 202 may be a computer that issues a data read/write request to the storage device 201. The host computer 202 may be, for example, a server or a personal computer (PC).

Figure 3:
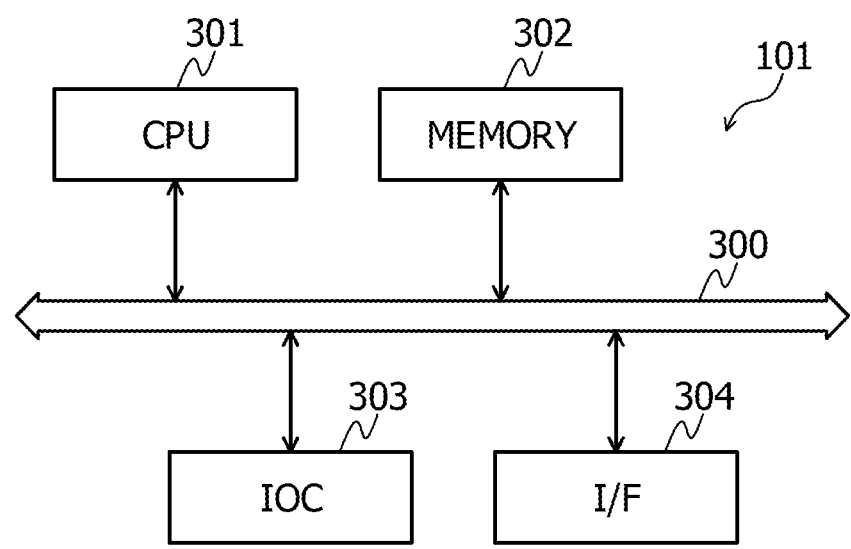
FIG. 3 illustrates an example of a hardware configuration of a parity-layout determination apparatus.

FIG. 3 illustrates an example of a hardware configuration of a parity-layout determination apparatus. The parity-layout determination apparatus 101 has a central processing unit (CPU) 301, a memory 302, an input/output controller (IOC) 303, and an interface (I/F) 304. The CPU 301, the memory 302, the IOC 303, and the I/F 304 are coupled to each other through a bus 300.

The CPU 301 is responsible for overall control of the parity-layout determination apparatus 101. The memory 302 has, for example, a read only memory (ROM), a random access memory (RAM), or a flash ROM. For example, the flash ROM or the ROM stores various programs, and the RAM is used as a work area for the CPU 301. When the programs stored in the memory 302 are loaded into the CPU 301, the programs cause the CPU 301 to execute coded processes.

The IOC 303 is coupled to the host computers 202 to control writing/reading of data to/from the host computers 202. The IOC 303 is coupled to the storage device 201 to control writing/reading of data to/from the storage device 201.

The I/F 304 is coupled to a network through a communication channel and is coupled to another computer through the network. The I/F 304 is responsible for interfacing between the network and inside of the parity-layout determination apparatus 101 to control input/output of data to/from another computer. As the I/F 304, for example, a modem or a LAN adapter may be employed. The I/F 304 is coupled to the host computers 202 and may control writing/reading of data to/from the host computers 202.

The parity-layout determination apparatus 101 may have, for example, an SSD, a keyboard, a mouse, or a display, in addition to the constituent elements described above.

Figure 4:
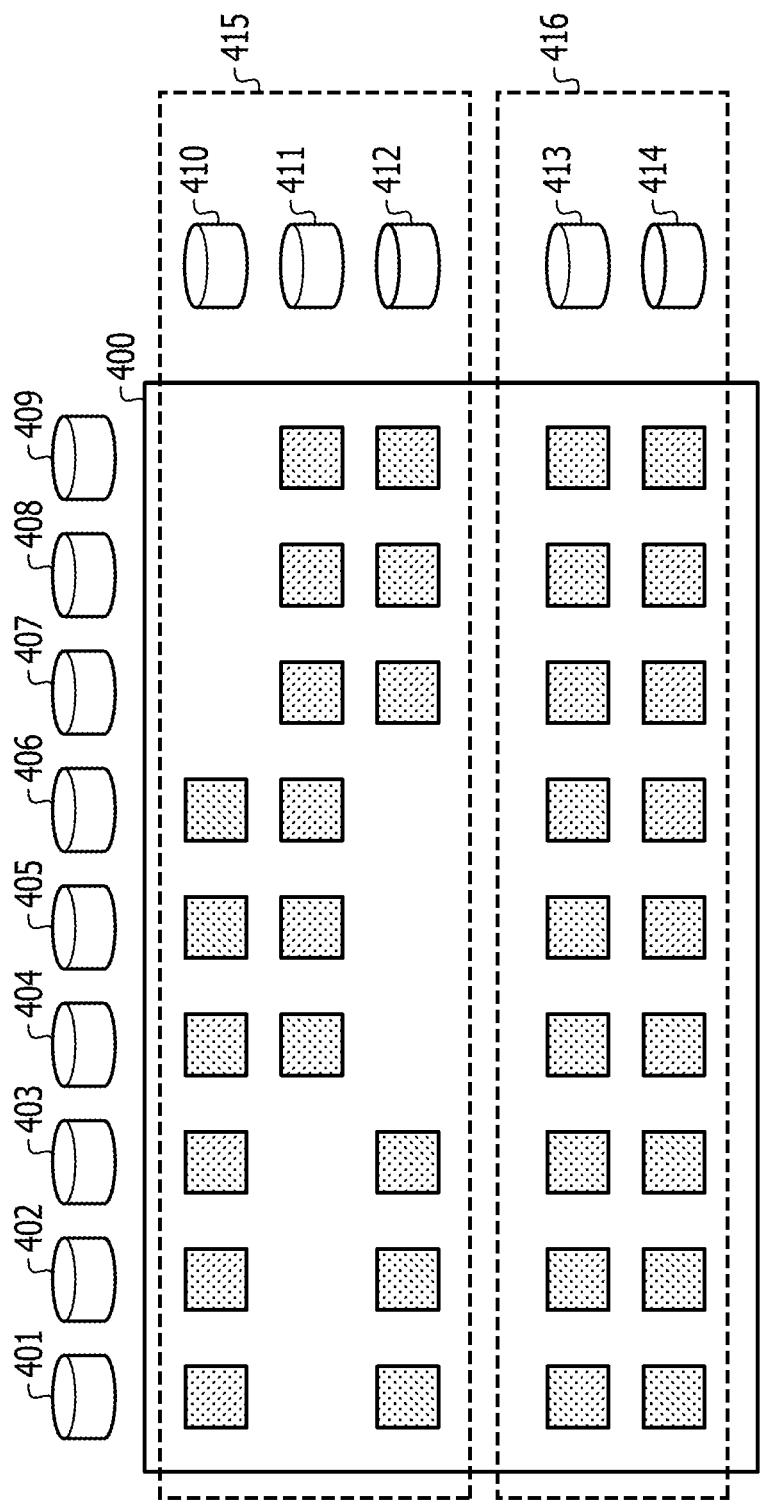
FIG. 4 illustrates an example of a parity layout.

FIG. 4 illustrates an example of a parity layout. In FIG. 4, for example, a parity layout 400 is created or updated by the parity-layout determination apparatus 101 and is stored in the memory 302 in the parity-layout determination apparatus 101.

FIG. 4 illustrates the parity layout 400 created in the case of k=9 for the number of data chunks, m=5 for the total number of parity chunks, c=4 for the total value of reliability indices, and n=2 for the number of layout stages. The "number of layout stages" indicates the number of parity layouts to be combined. In FIG. 4, data areas for storing data are disks 401 to 409, and parity areas for storing parity are disks 410 to 414.

The disks 401 to 414 may be disks having substantially the same storage capacity. In the following description, the storage capacity of the disks 401 to 414 may be set to 1. A unit of storage capacity is, for example, terabyte (TB).

The parity layout 400 may be a local parity layout created from a combination of $(m_1, c_1)=(3, 2)$ and $(m_2, c_2)=(2, 2)$ in which the number n of layout stages is 2 and that satisfy $m=m_1+m_2$ and $c=c_1+c_2$. A local parity layout 415 is created from $(m_1, c_1)=(3, 2)$, and a local parity layout 416 is created from $(m_2, c_2)=(2, 2)$. The local parity layout 400 is created by combining the local parity layouts 415 and 416.

In the local parity layout 415, the length of the parity calculation range is 6. The disk 410 stores parity of the disks 401 to 406, the disk 411 stores parity of the disks 404 to 409, and the disk 412 stores parity of the disks 401 to 403 and 407 to 409.

Thus, in the local parity layout 415, the total value of the reliabilities is 2, and even when two disks of the disks 401 to 409 fail, data may be recovered. The local parity layout 415 is referred to as "SHEC (9, 3, 2)", since the number of data chunks is 9, the total number of parity chunks is 3, and the total value of the reliability indices is 2.

In the local parity layout 416, the length of the parity calculation range is 9. The disk 413 stores parity of the disks 401 to 409, and the disk 414 stores parity of the disks 401 to 409.

Accordingly, in the local parity layout 416, the total value of the reliability is 2, and thus, even when two disks of the disks 401 to 409 fail, data may be recovered. The local parity layout 416 is referred to as "SHEC (9, 2, 2)", since the number of data chunks is 9, the total number of parity chunks is 2, and the total value of reliability indices is 2.

The local parity layout 400 is formed by combining the local parity layout 415 and the local parity layout 416, and the lengths of the parity calculation ranges are different. The local parity layout 400 is formed by combining the local parity layout 415 and the local parity layout 416, and the total value of the reliabilities 4. Thus, when four disks of the disks 401 to 409 fail, data may be recovered. In the local parity layout 400, the number of data chunks is 9, the total number of parity chunks is 5, and the total value of the reliability indices is 4. Since SHEC (9, 3, 2) and SHEC (9, 2, 2) are combined, this combination is referred to as "multiple-SHEC (9, 3-2, 2-2)".

Figure 5:
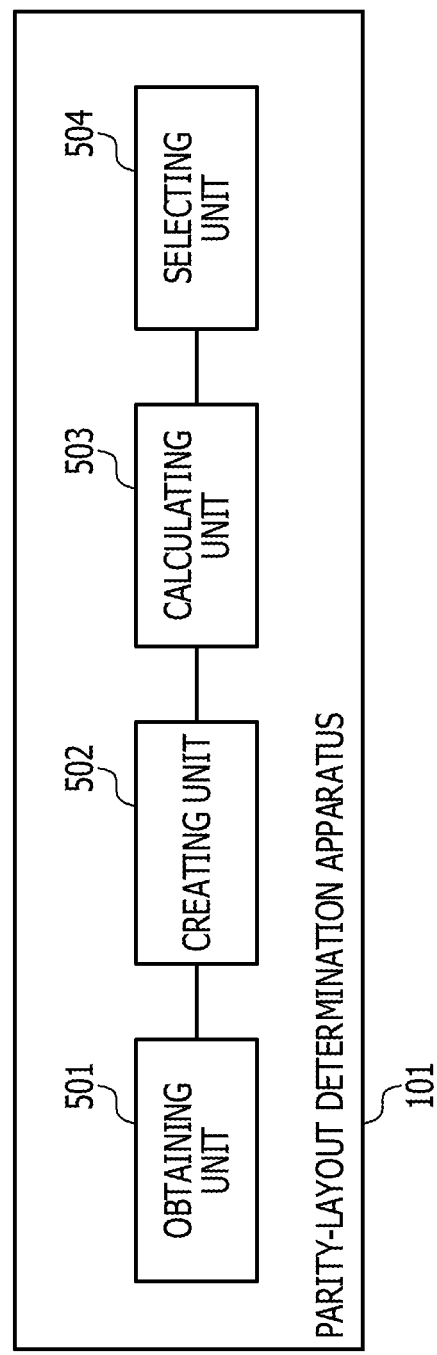
FIG. 5 illustrates an example of a functional configuration of a parity-layout determination apparatus.

FIG. 5 illustrates an example of a functional configuration of a parity-layout determination apparatus. The parity-layout determination apparatus 101 in FIG. 5 includes an obtaining unit 501, a creating unit 502, a calculating unit 503, and a selecting unit 504. A control unit includes the obtaining unit 501, the creating unit 502, the calculating unit 503, and the selecting unit 504 and realizes functions thereof, for example, by causing the CPU 301 to execute a program stored in a storage device, such as the memory 302 illustrated in FIG. 3. Processing results of the functional units may be stored, for example, in a storage device, such as the memory 302 illustrated in FIG. 3.

The obtaining unit 501 has a function for obtaining the number k of data chunks, the total number m of parity chunks, the total value c of reliability indices, and the number n of layout stages. For example, when the user performs inputting using a keyboard of the parity-layout determination apparatus 101, the obtaining unit 501 obtains the number k of data chunks, the total number m of parity chunks, the total value c of reliability indices, and the number n of layout stages. For example, the obtaining unit 501 may obtain the number k of data chunks, the total number m of parity chunks, the total value c of reliability indices, and the number n of layout stages from a terminal apparatus communicatable with the parity-layout determination apparatus 101.

The obtaining unit 501 reports the obtained number k of data chunks, the obtained total number m of parity chunks, the obtained total value c of reliability indices, and the obtained number n of layout stages to the creating unit 502. Each of k, m, c, and n is a positive integer greater than or equal to 1. For example, the obtaining unit 501 obtains k=9, m=5, c=4, and n=2 for the number k of data chunks, the total number m of parity chunks, the total value c of reliability indices, and the number n of layout stages, respectively, and reports the obtained values to the creating unit 502.

The creating unit 502 has a function for creating a local parity layout, based on the number k of data chunks, the total number m of parity chunks, the total value c of reliability indices, and the number n of layout stages, the numbers and values being reported from the obtaining unit 501. The creating unit 502 reports the created local parity layout to the calculating unit 503.

Based on the number n of layout stages, the creating unit 502 divides each of the total number m of parity chunks and the total value c of the reliability indices into n values and extracts all combinations $(m_1, c_1), \ldots,$ and $(m_n, c_n)$. In this case, the creating unit 502 divides each of the total number m of parity chunks and the total value c of the reliability indices into n values so as to satisfy $m=\Sigma m_i$ and $c=\Sigma c_i$. In this case, the range of the summation $\Sigma$ is i=1 to n, and $m_1$ to $m_n$ and $c_1$ to $c_n$ each indicate a positive integer greater than or equal to 1.

The creating unit 502 creates n local parity layouts from the extracted combinations $(m_i, c_i)$, where i=1 to n. The creating unit 502 combines the created n local parity layouts to create a local parity layout and reports the created local parity layout to the calculating unit 503.

For example, the creating unit 502 creates the local parity layout in the following manner. The creating unit 502 creates one local parity layout SHEC $(k, m_1, c_1)$, based on the number k of data chunks and a combination $(m_1, c_1)$ indicating the total number of parity chunks and the total value of the reliability indices. Similarly, the creating unit 502 creates one local parity layout SHEC $(k, m_2, c_2)$, based on the number k of data chunks and $(m_2, c_2)$ indicating the total number of parity chunks and the total value of the reliability indices. The creating unit 502 performs similar processing up to $(m_n, c_n)$ to create n local parity layouts SHEC $(k, m_1, c_1)$ to SHEC $(k, m_n, c_n)$.

The creating unit 502 creates one local parity layout SHEC $(k, m_1— \ldots —m_n, c_1— \ldots —c_n)$ by combining n local parity layouts SHEC $(k, m_1, c_1)$ to SHEC $(k, m_n, c_n)$. As described above, the creating unit 502 creates one local parity layout multiple-SHEC $(k, m_1— \ldots —m_n, c_1— \ldots —c_n)$, based on one combination $(m_1, c_1), \ldots,$ or $(m_n, c_n)$.

For example, when k=9, m=5, c=4, and n=2 are reported from the obtaining unit 501 to the creating unit 502, the creating unit 502 divides each of the total number m of parity chunks and the total value c of reliability indices into two values, based on the number of layout stages, n=2. For example, the creating unit 502 extracts the following 12 combinations as combinations of $(m_1, c_1)$ and $(m_2, c_2)$:

(1) (1, 1) and (4, 3)
(2) (1, 2) and (4, 2)
(3) (1, 3) and (4, 1)
(4) (2, 1) and (3, 3)
(5) (2, 2) and (3, 2)
(6) (2, 3) and (3, 1)
(7) (3, 1) and (2, 3)
(8) (3, 2) and (2, 2)
(9) (3, 3) and (2, 1)
(10) (4, 1) and (1, 3)
(11) (4, 2) and (1, 2)
(12) (4, 3) and (1, 1)

For example, for (1) (1, 1) and (4, 3), the creating unit 502 creates a local parity layout SHEC (9, 1, 1) from the combination (1, 1) and creates a local parity layout SHEC (9, 4, 3) from the combination (4, 3). The creating unit 502 creates one local parity layout multiple-SHEC (9, 1-4, 1-3) by combining the two local parity layouts SHEC (9, 1, 1) and SHEC (9, 4, 3).

Similarly, the creating unit 502 creates two local parity layouts described below, based on the following 12 combinations, and combines the created local parity layouts to create one local parity layout.

(1) SHEC (9, 1, 1)+SHEC (9, 4, 3)
(2) SHEC (9, 1, 2)+SHEC (9, 4, 2)
(3) SHEC (9, 1, 3)+SHEC (9, 4, 1)
(4) SHEC (9, 2, 1)+SHEC (9, 3, 3)
(5) SHEC (9, 2, 2)+SHEC (9, 3, 2)
(6) SHEC (9, 2, 3)+SHEC (9, 3, 1)
(7) SHEC (9, 3, 1)+SHEC (9, 2, 3)
(8) SHEC (9, 3, 2)+SHEC (9, 2, 2)
(9) SHEC (9, 3, 3)+SHEC (9, 2, 1)
(10) SHEC (9, 4, 1)+SHEC (9, 1, 3)
(11) SHEC (9, 4, 2)+SHEC (9, 1, 2)
(12) SHEC (9, 4, 3)+SHEC (9, 1, 1)

In this case, "+" indicates combining local parity layouts.

SHEC (9, 3, 2) in (8) may correspond to the local parity layout 415 in FIG. 4, and SHEC (9, 2, 2) in (8) may correspond to the local parity layout 416 in FIG. 4. The multiple-SHEC (9, 3-2, 2-2), which is a combination of SHEC (9, 3, 2) and SHEC (9, 2, 2), may correspond to the local parity layout 400 in FIG. 4.

The calculating unit 503 calculates the recovery efficiency of the local parity layout reported from the creating unit 502. For example, the calculating unit 503 calculates an average amount of data for recovering information stored in a failed data chunk or parity chunk, divides the calculated average amount of data by the capacity of the parity chunks and the data chunks, and calculates the reciprocal of the result of the division. The reciprocal of the result of the division may be the recovery efficiency. The average amount of data may also be calculated by an addition of values obtained by dividing the respective amounts of data for recovering information stored in each of data chunks or parity chunks by the respective capacities of the data chunks and the parity chunks. The calculating unit 503 notifies the selecting unit 504 about the recovery efficiencies calculated for the respective local parity layouts.

The calculating unit 503 may or may not calculate the recovery efficiency of a local parity layout for which the same recovery efficiency is calculated. For example, the same recovery efficiency is calculated for symmetrical local parity layouts, such as SHEC (9, 1, 3)+SHEC (9, 4, 1) and SHEC (9, 4, 1)+SHEC (9, 1, 3). Thus, the calculating unit 503 may or may not calculate the recovery efficiency of SHEC (9, 4, 1)+SHEC (9, 1, 3) after calculating the recovery efficiency of SHEC (9, 1, 3)+SHEC (9, 4, 1).

For example, in the case of the local parity layout 400 in FIG. 4, the recovery efficiency is calculated in the following manner.

(1) Information stored on the disk 401 is recovered from, for example, information on the disks 402 to 406 and 410. Thus, the amount of data for the recovery is 6. Similarly, for the disk 402 to 412, the amount of data for the recovery is 6. Thus, the number of disks recovered with the amount of data, 6, is 12.

(2) Information stored on the disk 413 is recovered from, for example, information on the disks 401 to 409. Thus, the amount of data for the recovery is 9. For the disk 414, similarly, the amount of data for the recovery is 9. Thus, the number of disks to be recovered with the amount of data, 9, is 2.

(3) Since the capacity of the data chunks and the parity chunks is 14, the average amount of data is $(6/14) \times 12 + (9/14) \times 2$.

(4) Since the capacity of the data chunks and the parity chunks is 14, the recovery efficiency is the reciprocal of $(6 \times 12/14 + 9 \times 2/14)/14$.

The selecting unit 504 selects a local parity layout having the best recovery efficiency among the reported recovery efficiencies calculated for the respective local parity layouts. For example, since the recovery efficiency increases as the amount of data used for recovery, the selecting unit 504 selects a local parity layout with the lowest recovery efficiency.

Figure 6:
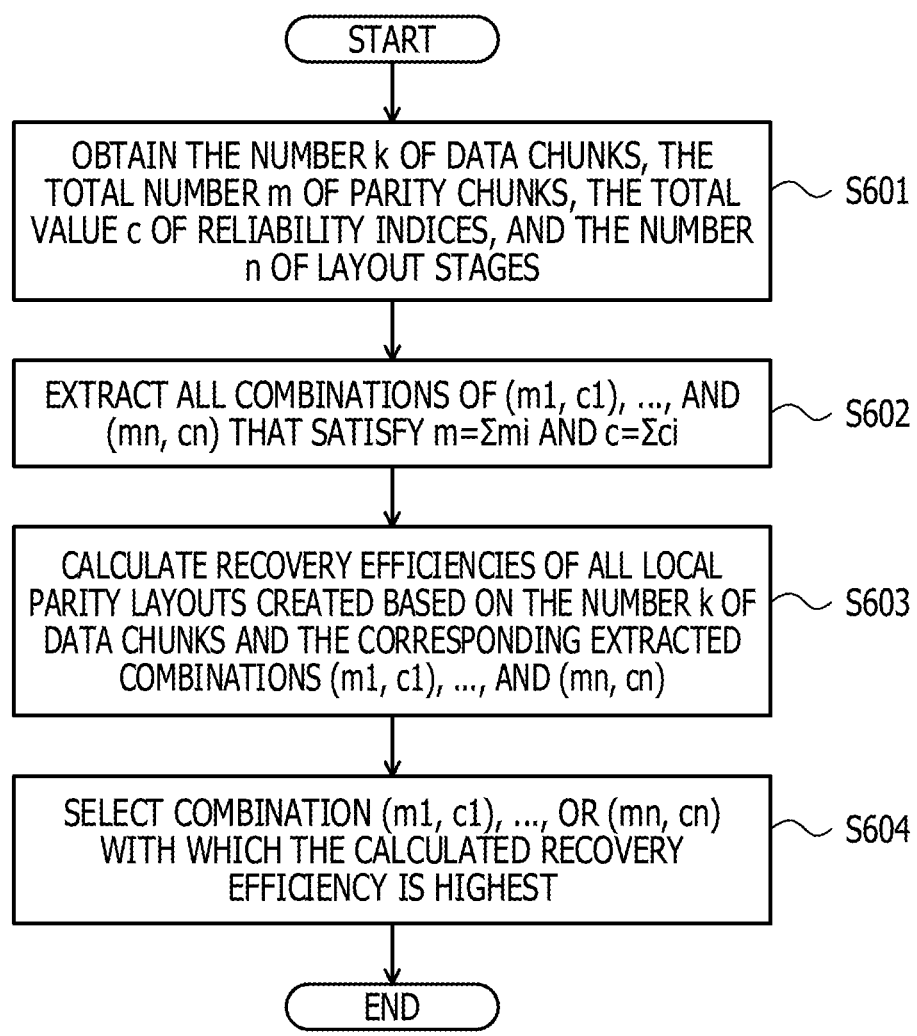
FIG. 6 illustrates an example of parity-layout determination processing.

FIG. 6 illustrates an example of parity-layout determination processing. The parity-layout determination apparatus 101 illustrated in FIG. 5 may execute the parity-layout determination processing illustrated in FIG. 6. In FIG. 6, the parity-layout determination apparatus 101 obtains the number k of data chunks, the total number m of parity chunks, the total value c of reliability indices, and the number n of layout stages (operation S601).

The parity-layout determination apparatus 101 extracts all combinations of $(m_1, c_1), \ldots,$ and $(m_n, c_n)$ that satisfy $m = \Sigma m_i$ and $c = \Sigma c_i$ (operation S602). The range of the summation $\Sigma$ is i=1 to n, and $m_1$ to $m_n$ and $c_1$ to $c_n$ each indicate a positive integer greater than or equal to 1.

The parity-layout determination apparatus 101 calculates recovery efficiencies of all local parity layouts created based on the number k of data chunks and the corresponding extracted combinations $(m_1, c_1), \ldots,$ and $(m_n, c_n)$ (operation S603).

For example, based on all of the combinations $(m_i, c_i)$, where i=1 to n, the parity-layout determination apparatus 101 creates all of n local parity layouts SHEC (k, $m_1$, $c_1$) to SHEC (k, $m_n$, $c_n$). The parity-layout determination apparatus 101 creates all of local parity layouts multiple-SHEC (k, $m_1$— ... —$m_n$, $c_1$— ... —$c_n$) by combining the n local parity layouts SHEC (k, $m_1$, $c_1$) to SHEC (k, $m_n$, $c_n$). The parity-layout determination apparatus 101 calculates the recovery efficiencies of all the created local parity layouts multiple-SHEC (k, $m_1$— ... —$m_n$, $c_1$— ... —$c_n$).

The parity-layout determination apparatus 101 selects a combination $(m_1, c_1), \ldots,$ or $(m_n, c_n)$ with the best calculated recovery efficiency (operation S604).

The series of processing ends. By executing the processing illustrated in FIG. 6, the parity-layout determination apparatus 101 determines a local parity layout with the best recovery efficiency.

Figure 7A:
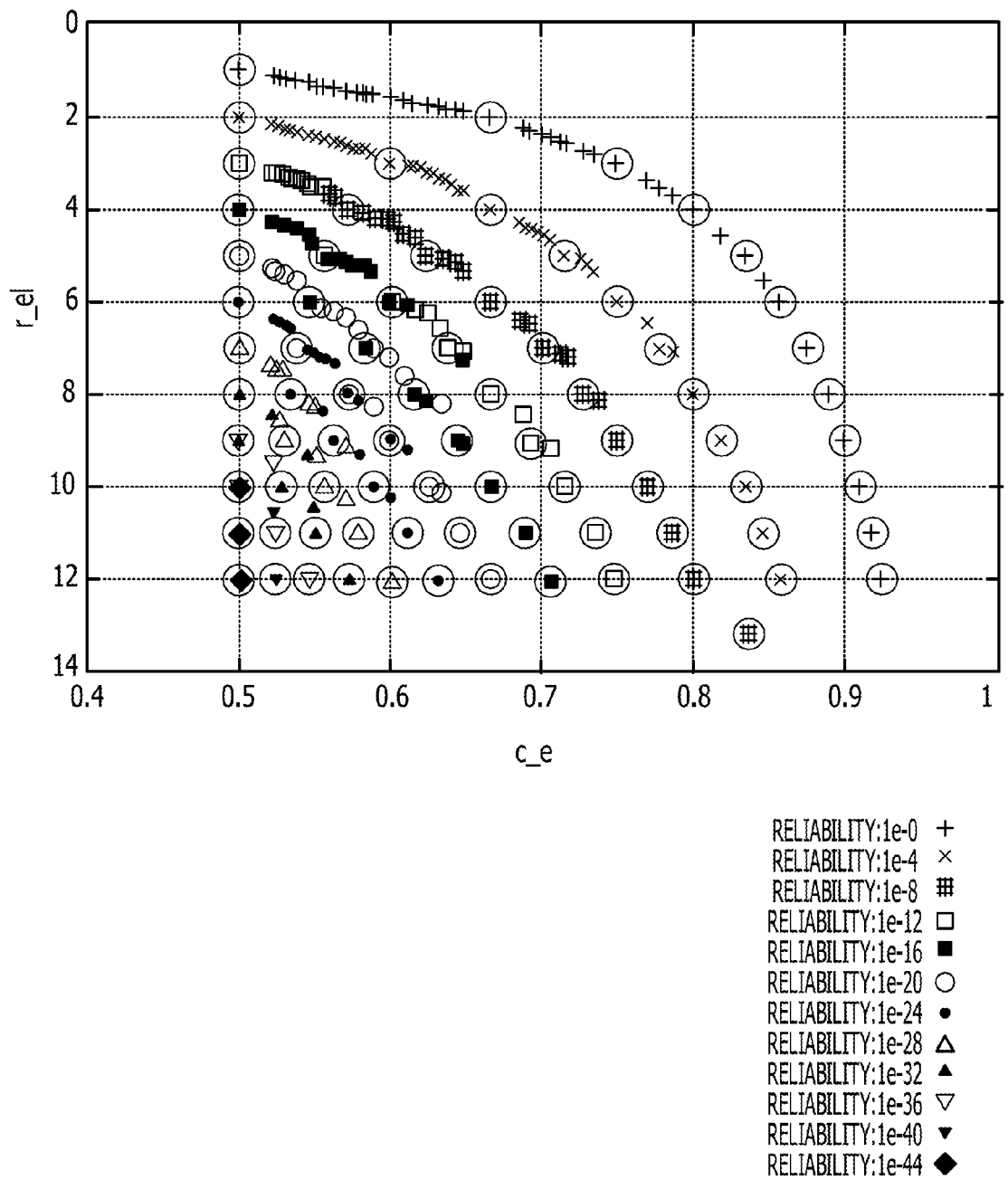
FIGS. 7A and 7B illustrate an example of a property map.
Figure 7B:
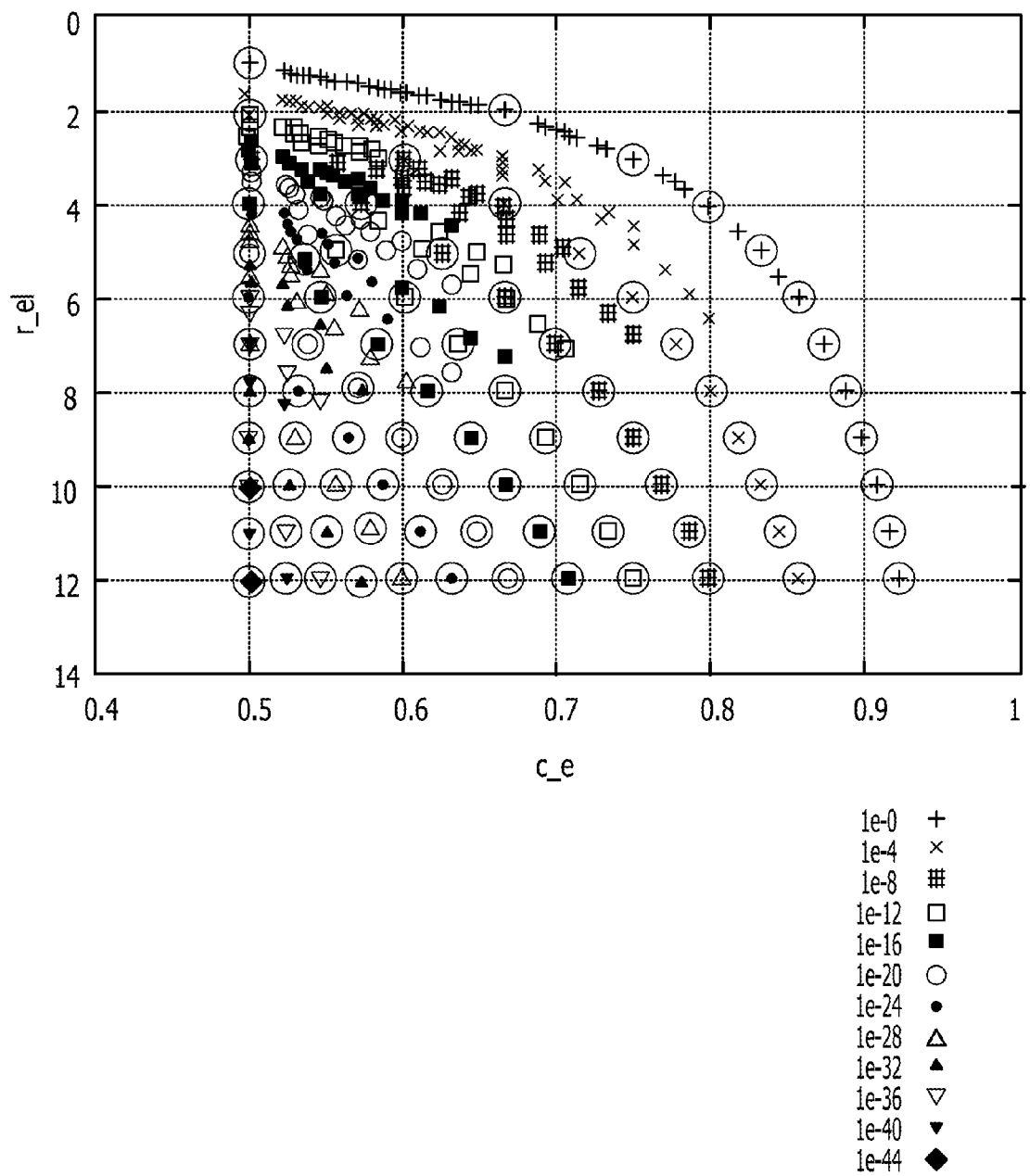

FIGS. 7A and 7B illustrate an example of a property map. FIGS. 7A and 7B illustrate an example of a property map indicating an advantage of the parity-layout determination apparatus 101. In the property map, a capacity efficiency c_e is set for the horizontal axis, a recovery number r_e1 is set for the vertical axis, and the reliabilities are represented by graphics. The layout plotted at a distance farther from the origin indicates that the performance is better in terms of an overall balance. In the property map, the number k of data chunks, the total number m of parity chunks, the total value c of reliability indices, reliabilities of disks corresponding to storage areas, and so on are input, and the capacity efficiency c_e, the recovery number r_e1 and the reliability are calculated.

The capacity efficiency c_e is a rate of an area in which data is stored in the entire storage area. For example, the capacity efficiency c_e is calculated as k/(k+m) by using the number k of data chunks and the total number m of parity chunks. The closer to 0 the capacity efficiency c_e is, the smaller the capacity for storing data is and the worse the efficiency of storing data is.

The recovery number r_e1 is the average number of chunks for recovering information stored in a failed data chunk or a failed parity chunk. A larger recovery number r_e1 indicates that the amount of data used for recovering information stored in the failed data chunk or the failed parity chunk is larger, and thus, the recovery efficiency is not so good. For example, when six data chunks or parity chunks are used in order to recover information stored in one data chunk, the recovery number r_e1 is 6.

Each reliability indicates a probability that a failure by which information that is stored is not recoverable occurs in a storage device having a storage area based on the local parity layout. The smaller the value of the reliability is, the better the reliability of the storage device is. For example, 1e-4 indicates that the probability that a failure by which information stored is not recoverable occurs in one year is one ten-thousands. The reliabilities are denoted by graphics, and for example, the reliability of a storage device having a storage area based on a local parity layout denoted by x is 1e-4.

In the property map, graphics representing the reliabilities and denoted by ○ represent global parity configurations. Graphic representing the reliabilities and not denoted by ○ represent local parity configurations.

FIG. 7A illustrates a SHEC configuration. FIG. 7B illustrates a multiple-SHEC configuration. Comparison of FIG. 7B with FIG. 7A indicates that the overall plotted position of the local parity configurations not denoted by ○ in the graphics moved upward. Accordingly, the recovery number may improve with multiple-SHEC, compared with the configuration of SHEC.

In the parity-layout determination method, the local parity layout 123 for making a plurality of pieces of data redundant and storing the pieces of data is created by combining the local parity layouts 121 and 122 in which the lengths of the calculation ranges for calculating the local parity are different from each other.

In the parity-layout determination method, the local parity layout 123 in which the lengths of the local-parity calculation ranges are different is created by combining the local parity layouts in which the lengths of the local-parity calculation ranges are fixed. In the parity-layout determination method, since the number of configurable layouts does not increase excessively, a parity layout in which the amount of data transferred during recovery is small is created within an allowable time. In the parity-layout determination method, when the capacity efficiency and the reliability are set to substantially the same values, a parity layout with which the recovery efficiency is good is created. The parity layout created by the parity-layout determination method has a good recovery efficiency. As a result, the amount of data transferred during recovery may be reduced, and the recovery time may be reduced.

In the parity-layout determination method, the number of data areas, the number of parity areas, and a reliability index indicating the degree of data redundancy are obtained. In the parity-layout determination method, a local parity layout for making a plurality of pieces of data redundant and storing the pieces of data may be created from a plurality of local parity layouts that satisfy the following three conditions:

(1) The number of data areas in each of a plurality of local parity layouts corresponds to the obtained number of data areas, (2) The total number of parity areas in each of the local parity layouts corresponds to the obtained number of parity areas, and (3) The total of reliability indices in each of the local parity layouts corresponds to the obtained number of reliability indices.

In the parity-layout determination method, a parity layout is created while maintaining the total number of parity chunks and the total value of the reliability indices. Thus, compared with a case in which the length of the parity calculation range is varied, the number of parity layouts to be created may not increase. In the parity-layout determination method, a parity layout in which the amount of data transferred during recovery is small is created within an allowable time. In the parity-layout determination method, a local parity layout that satisfies the number of data areas, the number of parity areas, and the reliability index that are specified by the user is created.

In the parity-layout determination method, the recovery efficiency indicating the ratio of the average amount of data for recovering information stored in the data areas or parity areas to the capacity of the data areas and the parity areas is calculated for each local parity layout. The local parity layout with the best calculated recovery efficiency may be selected.

In the parity-layout determination method, when a plurality of local parity layouts for making a plurality of pieces of data redundant and storing the pieces of data are created, the parity layout with the best recovery efficiency may be selected. In the parity-layout determination method, the number of options for the parity layout increases. Thus, compared with a case in which a local parity layout in which the lengths of the calculation ranges for calculating the local parity are the same is provided to the user, the recovery efficiency may improve. For each combination of parameters, such as the number k of data chunks, the total number m of parity chunks, and the total value c of reliability indices, one local parity layout is provided to the user. The total number of local parity layouts to be provided to the user may be substantially the same as the total number when a local parity layout in which the lengths of the calculation ranges for calculating the local parity are the same. Accordingly, the complexity of layout analysis may decrease.

The storage device 201 may have a storage area based on a local parity layout created by combining a plurality of local parity layouts in which the lengths of the calculation ranges for calculating the local parity among a plurality of pieces of data are different from each other. Thus, when the capacity efficiency and the reliability are set to substantially the same values, the storage device 201 may have a storage area having a good recovery efficiency.

A computer, such as a personal computer or a workstation, may be used to execute a prepared program to realize the parity-layout determination method. A parity-layout determination program is recorded to a computer-readable recording medium, such as a hard disk, a flexible disk, a compact disc read-only memory (CD-ROM), a magneto-optical (MO) disk, a digital versatile disk (DVD), or the like and is read from the recording medium and executed by a computer. The parity-layout determination program may also be distributed over a network, such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A parity-layout generating method, comprising:
   creating, by a computer, a first local parity layout, for data disks that store data and one or more first parity disks that store a parity, in which a reliability index indicating a range of recoverable failed storage area is a first reliability index and a number of data disks for calculating local parity is a first value;
   creating, by the computer, a second local parity layout, for the data disks and one or more second parity disks that store a parity, in which the reliability index is a second reliability index and the number of data disks for calculating local parity is second value which is different from the first value; and creating, by the computer, a third local parity layout, for the data disks and one or more third parity disks that store a parity, with a third reliability index calculated based on the first reliability index and the second reliability index and a third value calculated based on the first value and the second value by combining the first local parity layout and the second local parity layout.

2. The parity-layout generating method according to claim 1, wherein the range of recoverable failed storage area corresponds to a number of recoverable failed storage areas in the data disks.

3. The parity-layout generating method according to claim 1, wherein the third value is obtained by adding the first value and the second value.

4. The parity-layout generating method according to claim 1, wherein a failure of the data disks is recovered based on the third reliability index.

5. The parity-layout generating method according to claim 1, wherein the third local parity layout corresponds to the data disks, the one or more first parity disks and the one or more second parity disks.

6. The parity-layout generating method according to claim 1, wherein, when a number of third local parity layouts that are created is two or more, the third local parity layout with a best recovery efficiency which indicates a ratio of an average amount of data for recovering information stored in the data disks or the one or more third parity disks to a capacity of the data disks and the one or more third parity disks is selected from among the two or more third local parity layouts.

7. A parity-layout generating apparatus, comprising:
a memory configured to store a program; and
a processor configured to execute the program and, based on the program, the processor:
creates a first local parity layout, for data disks that store data and one or more first parity disks that store a parity, in which a reliability index indicating a range of recoverable failed storage area is a first reliability index and a number of data disks for calculating local parity is a first value;
creates a second local parity layout, for the data disks and one or more second parity disks that store a parity, in which the reliability index is a second reliability index and the number of data disks for calculating local parity; and
creates a third local parity layout, for the data disks and one or more third parity disks that store a parity, with a third reliability index calculated based on the first reliability index and the second reliability index and a third value calculated based on the first value and the second value by combining the first local parity layout and the second local parity layout.

8. The parity-layout generating apparatus according to claim 7, wherein the range of recoverable failed storage area corresponds to a number of recoverable failed storage areas.

9. The parity-layout generating apparatus according to claim 7, wherein a failure of the data disks is recovered based on the third reliability index in the data disks.

10. The parity-layout generating apparatus according to claim 7, wherein the third local parity layout corresponds to the data disks, the one or more first parity disks and the one or more second parity disks.

11. The parity-layout generating apparatus according to claim 7, wherein the third local parity layout corresponds to the data disks, the one or more first parity disks and the one or more second parity disks.

12. The parity-layout generating apparatus according to claim 7, wherein, when a number of third local parity layouts that are created is two or more, the third local parity layout with a best recovery efficiency which indicates a ratio of an average amount of data for recovering information stored in the data disks or the one or more third parity disks to a capacity of the data disks and the one or more third parity disks is selected from among the two or more third local parity layouts.

13. A storage system, comprising:
a storage device including a parity layout which is generated by a processor, the processor:
creates a first local parity layout, for data disks that store data and one or more first parity disks that store a parity, in which a reliability index indicating a range of recoverable failed storage area is a first reliability index and a number of data disks for calculating local parity is a first value;
creates a second local parity layout, for the data disks and one or more second parity disks that store a parity, in which the reliability index is a second reliability index and the number of data disks for calculating local parity; and
creates a third local parity layout, for the data disks and one or more third parity disks that store a parity, with a third reliability index calculated based on the first reliability index and the second reliability index and a third value calculated based on the first value and the second value by combining the first local parity layout and the second local parity layout.

14. The storage system according to claim 13, wherein the range of recoverable failed storage area corresponds to a number of recoverable failed storage areas in the data disks.

15. The storage system according to claim 13, wherein a failure of the data disks is recovered based on the third reliability index.

16. The storage system according to claim 13, wherein the third local parity layout corresponds to the data disks, the one or more first parity disks and the one or more second parity disks.

17. The storage system according to claim 13, wherein the third local parity layout corresponds to the data disks, the one or more first parity disks and the one or more second parity disks.

18. The storage system according to claim 13, wherein, when a number of third local parity layouts that are created is two or more, the third local parity layout with a best recovery efficiency which indicates a ratio of an average amount of data for recovering information stored in the data disks or the one or more third parity disks to a capacity of the data disks and the one or more third parity disks is selected from among the two or more third local parity layouts.

* * * * *